INVENTOR.
WALTER G. CAMACK
BY Frank D Prejus
ATTORNEY

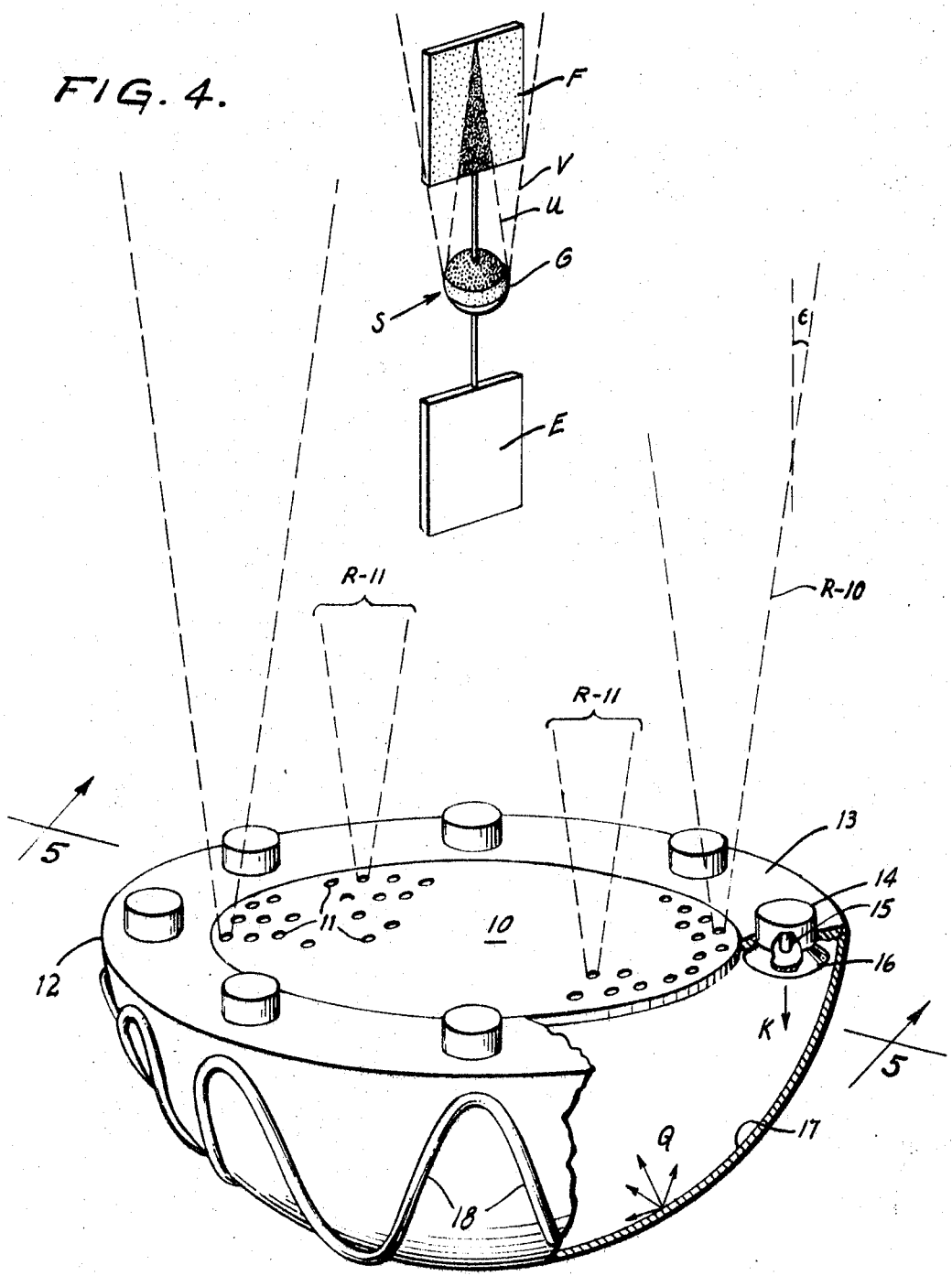

INVENTOR.
WALTER G. CAMACK
BY
Frank D. Proger
ATTORNEY

United States Patent Office 3,461,295
Patented Aug. 12, 1969

3,461,295
METHOD AND INSTRUMENT FOR SIMULATING ALBEDO RADIATIONS OF ASTRONOMICAL BODIES
Walter G. Camack, Palo Alto, Calif., assignor to Philco-Ford Corporation, a corporation of Delaware
Filed Jan. 29, 1965, Ser. No. 428,903
Int. Cl. G21h 5/00
U.S. Cl. 250—88                                        1 Claim

ABSTRACT OF THE DISCLOSURE

An instrument for simulating the albedo radiations of astronomical bodies. The instrument comprises means for generating the radiation, means for diffusing it and integrating it over an area, and a plate structure overlying said area. Said plate structure has openings no wider than their extension through the structure, for directionally transmitting the radiant energy.

This invention relates to a method of and apparatus for producing radiation of closely controlled nature. In particular, the new technique produces visual and thermal radiation of selected "directional" character, that is, light and heat radiated within a narrow range of solid angles, which light and heat are similar to the light and heat transmitted from a planet or the like into far space.

While being capable of many other applications, the new technique is especially useful for generating illumination which accurately simulates both "planet albedo," that is, planet-reflected sunlight and "planet emission" (predominantly, infrared), as received by bodies orbiting in space. The invention will be described as used for these and related purposes.

Heretofore, such simulation was attempted by means of various lamps or heaters and mainly by diffusely radiating of reflecting energy from a plate. For reasons explained hereinafter, such arrangements could not effectively and accurately provide the directional characteristics of the radiation to be simulated.

Therefore it is a broad object of this invention to provide a new and highly effective technique of directional radiation, and it is a specific object accurately to simulate directional illumination such as that arising from planet albedo and incident on a body orbiting the planet. The concepts of the invention have particular utility as applied to bodies orbiting a planet in reasonably close proximity thereto, as for example, applied to weather satellites in earth orbit.

Toward these objects the invention applies diffuse light to limited apertures in a screen surface, and converts this light into directional light by passing it from said surface through aperture and passage regions having greater length, transversely of said area, than their width or extension in said area. Advantageously each passage in the screen structure is defined by a reflective wall of forwardly tapering form, that is, expanding from the light receiving end to the light emitting end of the passage, and it is often preferred to utilize certain ranges of dimensional proportions in the forming of these tapering walls, as will be described and explained hereinafter.

In the drawing appended hereto, FIGURE 1 shows an orbiting spacecraft, irradiated by a planet, these bodies being shown as though viewed from some point in space remote from both. FIGURE 2 shows the irradiated spacecraft on a larger scale, in a view taken along line 2—2 in FIGURE 1. FIGURE 3 is a still larger view, showing the same spacecraft illuminated by a prior art planet simulator. These figures are presented for general orientation and for the identification of certain terms and problems.

FIGURE 4 is a perspective view of the new planet simulator, illuminating the aforesaid spacecraft.

Figure 1:
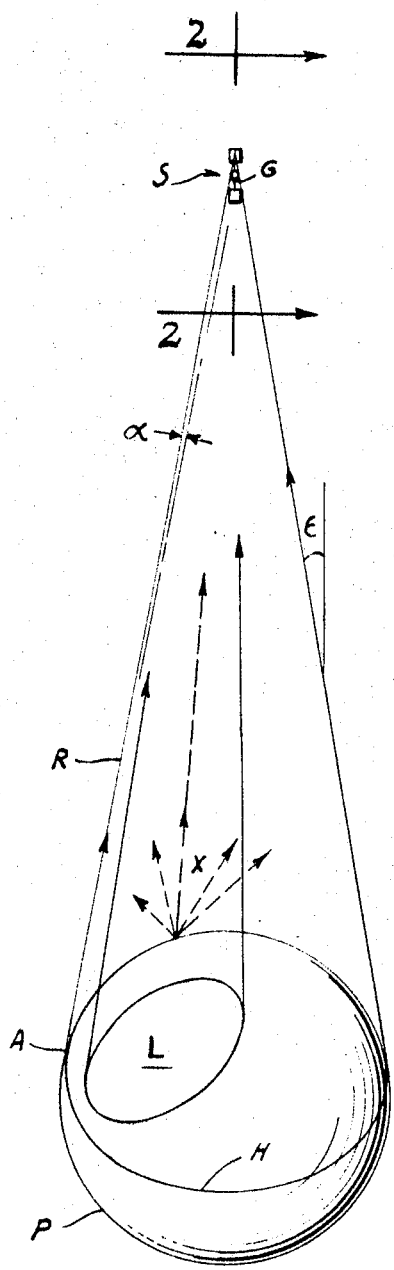

In FIGURE 1 spacecraft or satellite S is schematically shown as orbiting a planet P, which may for instance be the earth. Light or other radiation X is diffusely emitted or reflected from the surface of the planet, that is, rays are propagated in all directions above said surface. However, the spacecraft receives only a limited portion of this diffuse radiation, which portion is directionally applied thereto. This is due to the relative smallness of spacecraft S and the straight line propagation of light, over the considerable distance PS which may, for example, be of the order of hundreds or thousands of miles from the surface of planet P. The applied radiation is contained within a cone R, with the spacecraft at its apex and which has horizon H on the planet at the base thereof.

Figure 2:
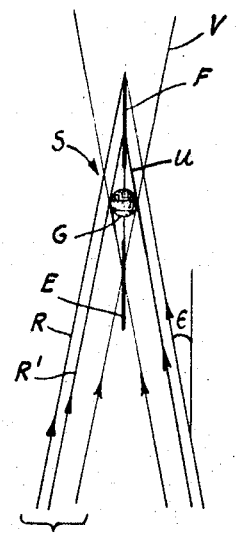

FIGURE 2 shows the apex region of cone R in greater detail. As an example, a spacecraft S is illustrated as having solar battery planes E and F on both sides of a sphere G, and which planes are seen edgewise in this figure, at a moment when plane E is entirely within light cone R and plane F at the apex of the same. A portion of plane F, adjacent sphere G, is immersed in umbra U cast by this sphere. A more remote portion of this plane lies in penumbra V, where it is relatively weakly illuminated by light from the planet. Only such light arrives in the penumbra zone as is confined between (1) the outer surface of light cone R, with the far end of plane F at its apex and (2) the inner and coaxial light cone surface R'. The latter surface is of similar shape as R and has the point of umbra U at its apex.

Conditions of the type shown by FIGURES 1 and 2 must be simulated in an earth-based laboratory if accurate results are to be obtained in studying for instance the thermal effects of radiation on spacecraft. Heretofore such study was attempted by simulators of the kind diagrammatically shown in FIGURE 3, which used a plate Y emitting or reflecting diffuse radiation C, C'. By suitable arrangement of spacecraft S relative to plate Y it was possible to form for instance an umbra U having shape and arrangement similar to that shown in FIGURE 2. However, major difficulty was then encountered with respect to the equally significant penumbra.

The reason lies in the fact that an actual diffusely emitting light source Y, located in the close vicinity of the irradiated object S, is not equivalent, as a matter of geometrical optics, to a remote planet wherefrom diffusely emitted light reaches a relatively small object S. When energy from a point A on planet P (FIGURE 1) irradiates a small and far distant sphere G, the sphere subtends only a minute angle α with respect to such illumination. The sphere then casts only a narrow penumbra V (FIGURE 2), expanding at a half angle which for all practical purposes is identical with the half angle ε of illuminating light cone R. By contrast (FIGURE 3) when irradiated by diffuse radiation R–Y from any point B of a relatively adjacent source Y, the same sphere G subtends a much larger angle β. It then casts a relatively wide penumbra W. In this and other respects the albedo simulators employed thus far provided inaccurate simulation.

Illumination of greatly improved accuracy is obtained by the light generator and planet simulator of this invention, which appears in perspective in FIGURE 4. This new illuminating apparatus generates diffuse light of proper brightness and spectral character, integrates the same, and by means of perforated plate structure 10 applies a desired directional characteristic thereto. The integrating of the diffuse light on the underside of plate 10 is preferably accomplished by use of a highly reflective hemisphere described below. This hemisphere serves to distribute the light uniformly to all apertures in this plate and thereby to produce uniform brightness of all light streams emitted at the top surface of the plate.

The integrated and directionally modified light is applied to spacecraft S, which is supported above plate 10 by suitable suspension means (not shown). When it is said that spacecraft S is suspended "above" the simulator, this is to be understood in the same sense as the term that a spacecraft orbits "above" the horizon H of a planet (FIGURE 1). Of course it is possible by suitable manipulators (not shown) to place the simulator so as to apply its light laterally or downwardly with respect to the earth-based laboratory. The distance from plate 10 to spacecraft S is made relatively large, compared with the dimensions of apertures 11.

In many cases, the spacecraft to be tested is also exposed to a "sun simulator," and is provided with thermometers and other sensing instruments and the like. Such devices are not shown herein, since the present invention is concerned with improved construction, operation, and illuminating effects of a simulator, rather than the cooperation of several simulators or of simulators and other devices.

The desired directional characteristic is impressed on the light produced in accordance with the invention by means of opaque screen or light filter plate structure 10, having apertures 11 of a certain type to be described presently. In order to illuminate each of these apertures uniformly, diffuse light is initially generated and is applied to the lower surface of the plate by means of light integrator 12. This integrator has support means 13 for a series of radiation sources 14, each comprising for instance a high intensity arc lamp 15 selected and controlled to generate light of suitable spectral content, the lamp being shielded from plate 10 by a baffle 16. The inner surface 17 of integrator housing 12, illuminated by these lamps, is a highly reflective hemisphere and is made as purely white as possible, in order to integrate radiation output K of the several lamps over the area of this housing and thus to produce diffuse light Q which fills the hemisphere and uniformly illuminates the underside of plate 10.

Figure 6:
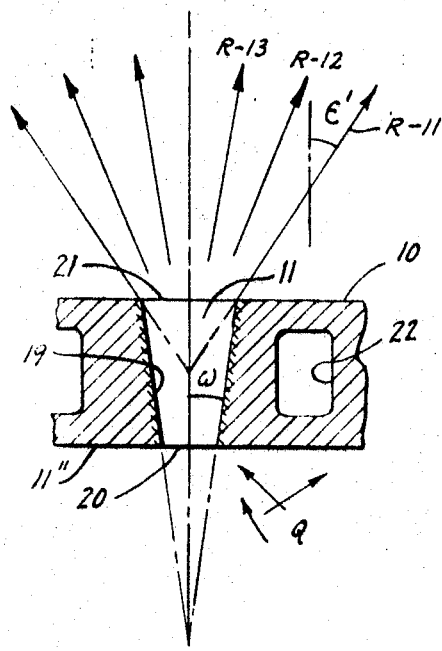
FIGURE 6 represents a detail from FIGURE 5 on a still larger scale.
Figure 5:
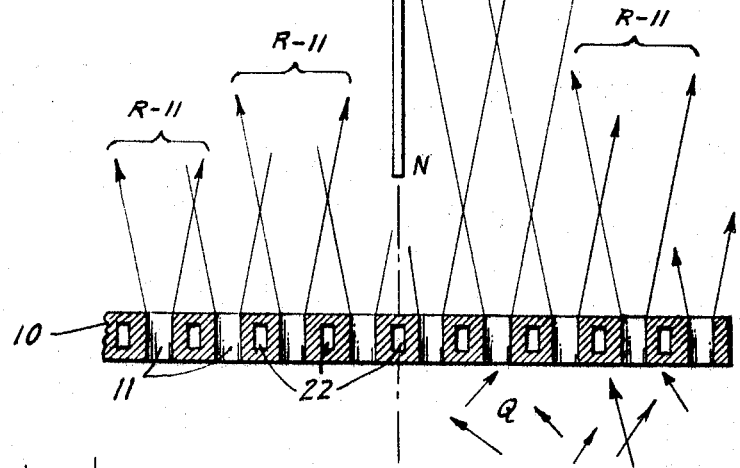
FIGURE 5 is a fragmentary and highly diagrammatic view, taken generally along line 5—5 in FIGURE 4 and drawn on a larger scale.

The desired directionality is imparted to the light by the screen apparatus of FIGURES 5 and 6, in order to simulate the directional illumination received under actual orbiting conditions. The light passes in generally upward direction through uniform apertures 11 in plate 10. Advantageously these apertures have a width or diameter greatly exceeding the wavelength of the radiation to be produced, in order to suppress interference effects and the like. For the simulation of planet radiation their diameter substantially exceeds 1 millimeter, the maximum wavelength of the visual-thermal (visual infrared) spectrum. They have a length at least of the same order of magnitude as their diameter, and in many cases, as indicated for instance in FIGURES 5 and 6, their length substantially exceeds their diameter. A high ratio of length to diameter is needed particularly when it is desired to simulate the illumination of a satellite orbiting the earth at an appreciable distance, such as thousands of miles above the surface, at which time the instrument must direct light to the satellite at angles $\epsilon$ close to zero and ranging only up to a small value, such for instance as five degrees or less. In such cases typical apertures 11 for an earth albedo simulator have a diameter of about a centimeter, and a length of several centimeters. Relatively wider apertures are used to simulate the illumination of an object at lower orbiting distance.

Thus it will be seen that the ratio of length to diameter of the apertures has strong influence on the exact directional character of the emitted light, and on the exact reception of planet albedo or planet radiation to be simulated. When the apertures are very much longer than they are wide, individual light cones R–11 approach the form of thin columns having cylindrical sides. By contrast, the emitted light beams approach the condition of diffuse light when the apertures are wider than long. Conical light beams R–11 of suitable half angles $\epsilon$ are produced by selecting other ratios of length to width of the screen plate apertures. Light is then emitted from the entire top surface of plate 10 as a bundle of strongly directional light cones R–11 of predetermined half-angle, one cone intersecting the other and all merging into a single uninterrupted light beam R–10 (FIGURE 5).

Preferably each light cone R–11 (FIGURE 6) is made substantially homogeneous, in the sense that individual rays R–12, R–13 therein strike individual unit surfaces with the same radiant flux. This result, along with the desired directional character of the radiation, is achieved by using narrow apertures 11 formed in a thick plate 10 which have side walls 19 of slightly tapering shape, expanding upwardly from narrow lower ends 20 to somewhat wider upper ends 21, at a small and uniform half-angle $\omega$ and wherein walls 19 have surfaces highly reflective to the radiation to be applied. Radiation then emerges as a sharply defined, homogeneous light cone. No radiation emerges outside of conical side surface R–11.

Figure 7:
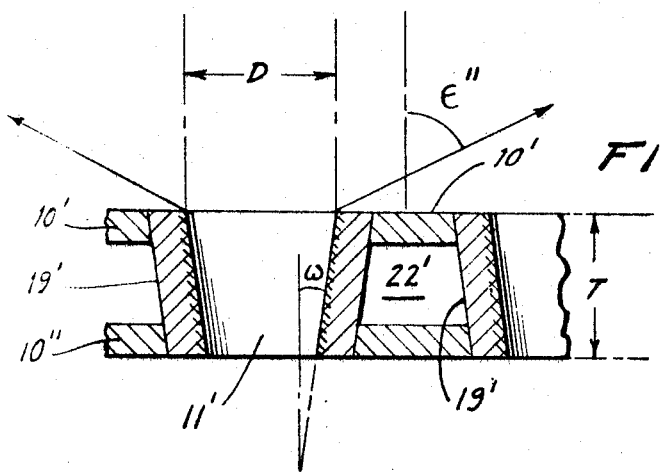
FIGURE 7 shows a modified detail in a view generally similar to FIGURE 6.

The shape of the light cone is related to, but wider (that is, less acutely-angled) than the shape of the aperture. For instance, when the apertures have walls which are inclined at an angle $\omega$ selected within the approximate range from one degree to five degrees, and when the plate is sufficiently thick and the aperture sufficiently long to make the diameter of top opening 20 equal about 1.7 times the diameter of bottom opening 20, half-angle $\epsilon'$ of the light cone is about forty to forty-five degrees. This is indicated in FIGURE 6, while relatively longer apertures and more acute half-angles $\epsilon$ are indicated in FIGURE 5. By contrast, FIGURE 7 shows relatively shorter apertures and wider half-angles $\epsilon''$. In most cases the shape of the light cone emerging from the relatively large apertures is not much affected by the use of different wavelengths of radiation Q, within the visual and near infrared range.

The use of a relatively thick plate structure 10 is advantageous not only in that it allows the use of long apertures 11 emitting strongly directional light of small half-angle $\epsilon$ to simulate the reception of radiation in orbits of appreciable light, but also in that it enables the plate to support itself when peripherally held by ring 13 (FIGURE 4). Thus it is possible to avoid any need for auxiliary supports or girder structures holding the plate, while the use of such structures would make it impossible for some portions of the screen plate uniformly to emit light beams and thereby to simulate the light cone R applied in space (FIGURES 1 and 2). Accordingly the plate structure is shown (FIGURE 6, full lines) as being rather thick, and as solid and unitary except for certain passages therein. However, it is also possible to insert light passage structures in form of short pipes or nipples 19' between separate upper and lower plates 10', 10", as shown in FIGURE 7.

It is preferred to support screen plate 10 peripherally, by a ring-shaped plate 13 fitted into an edge portion of integrator housing 12 and approximately coplanar in relation with plate 10, as shown. By means of this arrangement the hemispherical unit 10, 12, 13, 14 becomes substantially analogous to a so-called Ulbricht Sphere. For this purpose it is further preferred to apply light to plate 10, and so for as possible to hemispheric surface 17, substantially solely by inter-reflection from diffusely reflecting hemispheric surface portions. Lamp structures 14 can be provided with suitable reflectors or shields (not shown) in order to promote this effect.

Figure 3:
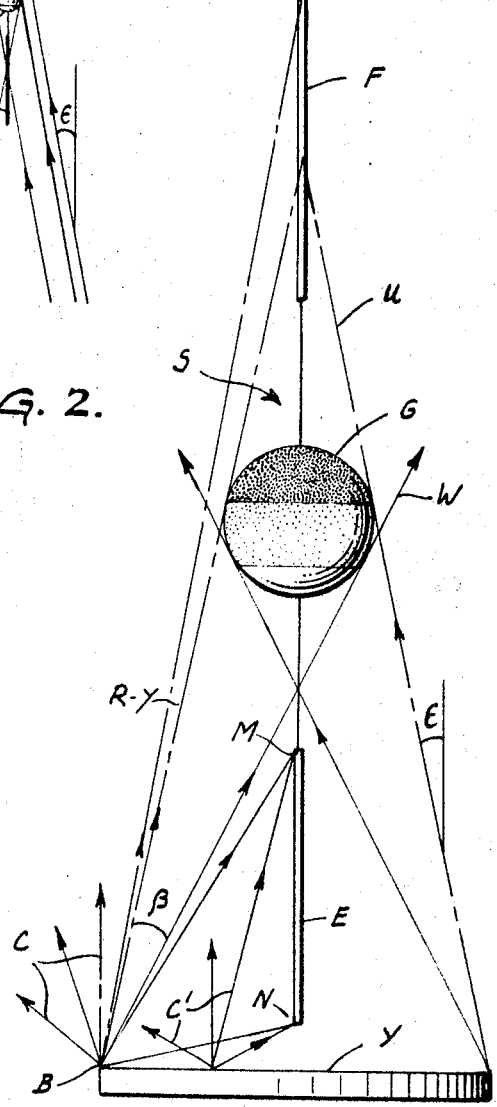

The new light generator, integrator and directional filter (FIGURE 4) produces light cones R-11 which jointly form a light beam R-10 of suitable directional character and angle ε as required for the simulation of a given orbital condition. All of the light in said cones R-11 is propagated in directions either normal to the top surface of screen plate 10 or inclined only up to the desired angle ε, as noted above. No light is emitted in more obliquely inclined directions, or horizontally, as was the case with uncontrolled diffuse emission C (FIGURE 3). By thus producing a wide beam of strongly directional light flux the new device provides greatly improved simulation of planet radiation.

In order to evaluate this fully, reference will be made once more to FIGURE 3. In case of diffuse radiation C from the top surface of simulator plate Y, vertically spaced points M and N on plane E were illuminated with different brightness, while far out in space (FIGURE 2) such points are substantially uniformly illuminated. The new device (FIGURE 5) accurately simulates a given condition, prevailing in space, as it illuminates points M and N with substantially identical brightness by the suitably directional light cones R-11 emitted from screen plate apertures 11 and which jointly form the combined light beam R-10. It is to be noted that in this new arrangement, a point M or N is illuminated only by relatively adjacent light cones R-11, and not by any portions of the light from laterally far distant screen plate apertures. In this respect the invention differs widely from the plain, diffuse illumination, wherein a point N received light from all surface portions of the diffuse light source.

Due to this feature and due to the aforementioned homogeneity of the emitted light cones, the illumination of a body by the new simulator is dependent only on the angular orientation of the body, for instance on placing plane E in a position normal to plate 10, and is substantially independent from the exact location of the body relative to the directional light filter. The new light filter and integrator jointly produce such directional and uniformly distributed light flux that the exact location of plane or spacecraft E, above the area of simulator plate 10, is no longer critical.

In this respect, as well as those already explained, the new method differs significantly from the prior diffuse irradiation (FIGURE 3), where plane E had to be located axially of simulator plate Y if both sides of the plane were to be illuminated equally. In the new arrangement (FIGURE 5), vertical plane E can be shifted considerably from the position shown in full lines (for instance horizontally to non-central position E', or also vertically to any desired positions partly shown at E" and E'") without significant change of illumination applied to both sides of the plane.

Aside from shade effects, as shown in FIGURE 4 at U and V, the new process illuminates different portions of a plane surface substantially uniformly, as does the actual planet radiation. In these respects and with respect to the form and density of shadows U, V and the like, the new apparatus simulates the conditions existing in space (FIGURES 1 and 2) with appreciably greater fidelity than the prior art devices.

This increased fidelity in reproducing actual conditions, which is gained by the new provision for a wide, homogeneous, and strongly directional light beam R-10, is maintained by directional readjustment in certain cases. For instance, if it becomes necessary to simulate albedo received by a spacecraft in orbits of different radii, the conditions to be simulated involve light cone angles other than ε (FIGURE 1). Different screen plate apertures are then used, while the light generating and integrating apparatus can continue to be used without change. In all cases the screen plate apertures used according to the invention are at least approximately as long as wide, and sometimes much longer. The actual range of length to width, to be used at any one time, is best selected in keeping with the orbital condition to be simulated.

FIGURE 7 shows a simulator plate 10', 10" with apertures emitting a light cone of relatively wide half-angle ε", by means of a substantially lower ratio of aperture length to diameter than is used in FIGURE 6. The plate thickness T can remain the same in FIGURE 7 as in FIGURE 6 if apertures 11' of relatively wide diameter D are used. It is also possible, although not necessary, to use the same profile angle ω (about 1 to 5 degrees) as in FIGURE 6. In some cases the apertures used according to this invention are approximately cylindrical. The use of reflective apertures with slight upward taper, as described, leads to high accuracy in limiting the light cones to a predetermined maximum half-angle, such as ε. Light rays entering the aperture in near-horizontal direction are guided into near-vertical direction, by repeated internal reflections, while light rays are directly (non-reflectively) passed through the aperture only in near-vertical direction, by virtue of the relative length and narrowness of the aperture.

In order to utilize the wider light cones, plate 10 with apertures 11 (FIGURE 6) can be removed from the apparatus of FIGURE 4. The modified plate 10', 10" of FIGURE 7 is then inserted. However, it is also possible to provide a single simulator plate having apertures of different shapes and proportions, and with a shutter system or the like (not shown) for selecting or modulating a set of apertures for actual use. Such a system can either lengthen and shorten apertures of the screen plate, in unison, or close one set of apertures while opening another with it interspersed therewith.

Finally, it should be noted that special precautions are sometimes needed with respect to the selection of radiant energy, and especially infrared energy, to be applied in a test. For this reason the top surfaces of screen plate 10 and lamp unit 13, 14 are preferably black and highly absorptive, thus avoiding stray reflections. If thermal convection currents in the vicinity of spacecraft S are significant, it becomes necessary to maintain a partial vacuum in the entire test space. In many instances it is also desirable to control the temperature of light emitting apparatus 10 to 14, for instance by refrigerant pipes 18 attached to the outside of hemisphere 12 and with means, not shown, for circulating a cooling fluid such as liquid nitrogen in said pipes. Similar cooling can be applied to screen plate 10 or 10' (FIGURES 6 and 7), by circulating such fluid through passage means 22 provided in such plate, between apertures 11, 11'.

Throughout this description and the claims which follow, when reference is made to "illumination" or "light," both visible and invisible radiations are meant. The light may be infrared, including thermal radiation, or visible or ultraviolet, except where some specific spectral selection is indicated. For the invention, the directional geometrical character of the applied illumination is most significant.

While only a single mode of performing the new method, and a single form of apparatus for this purpose have been described completely, the details thereof are not to be construed as limitative of the invention. The invention contemplates such variations and modifications as come within the scope of the appended claims.

I claim:

1. In a method of albedo testing a space vehicle on the ground: utilizing a plurality of individual light sources to generate a series of separate bundles of directive illumination; adjusting the wavelengths of said sources to a predetermined albedo-simulating wavelength; reflecting the light of said separate bundles of illumination by a substantially white and substantially parabolic surface, thereby diffusing said light and integrating said separate bundles throughout said white parabolic surface; filtering the diffused and integrated light through passages substantially covering an area lying between said surface and the space vehicle, said passages being disposed in said area in close adjacency and each having a width no greater than its length, whereby the light is rendered directive; and applying the filtered light to said vehicle.

References Cited

UNITED STATES PATENTS

| | | | |
|---|---|---|---|
| 1,621,224 | 3/1927 | Scott | 240—46.39 |
| 2,506,951 | 5/1950 | Doane | 240—46.51 |
| 3,100,828 | 8/1963 | Jacobs et al. | 250—89 |
| 3,118,065 | 1/1964 | Rijnders | 250—88 |
| 3,248,554 | 4/1966 | Chen | 250—227 |

RALPH G. NILSON, Primary Examiner

A. L. BIRCH, Assistant Examiner

U.S. Cl. X.R.

240—46; 250—85, 86